US012684285B1

(12) United States Patent
Robotham

(10) Patent No.: US 12,684,285 B1
(45) Date of Patent: Jul. 14, 2026

(54) LOUDSPEAKER CABINET INCORPORATING CURVED VENTS

(71) Applicant: Robotham Creative, Inc., Scituate, MA (US)

(72) Inventor: Thomas Robotham, Scituate, MA (US)

(73) Assignee: Robotham Creative, Inc., Scituate, MA (US)

( * ) Notice: Subject to any disclaimer, the term of this patent is extended or adjusted under 35 U.S.C. 154(b) by 0 days.

(21) Appl. No.: 19/223,985

(22) Filed: May 30, 2025

(51) Int. Cl.
*H04R 1/28* (2006.01)
*H04R 1/24* (2006.01)
*H04R 3/14* (2006.01)

(52) U.S. Cl.
CPC ............. *H04R 1/2826* (2013.01); *H04R 1/24* (2013.01); *H04R 3/14* (2013.01)

(58) Field of Classification Search
CPC ........... H04R 1/2826; H04R 1/24; H04R 3/14
USPC .......................................................... 381/337
See application file for complete search history.

(56) References Cited

U.S. PATENT DOCUMENTS

| | | | | |
|---|---|---|---|---|
| 2,491,982 | A | 12/1949 | Kincart | |
| 3,688,864 | A | 9/1972 | Guss | |
| 4,201,274 | A | 5/1980 | Carlton | |
| 4,593,784 | A | 6/1986 | Flanders et al. | |
| 4,969,196 | A * | 11/1990 | Nakamura | H04R 1/2865 381/345 |
| 5,012,889 | A * | 5/1991 | Rodgers | H04R 1/2819 381/349 |
| 5,804,774 | A * | 9/1998 | Ford | G10K 9/04 181/188 |
| 6,411,720 | B1 | 6/2002 | Pritchard | |
| 8,066,095 | B1 | 11/2011 | Bromer | |
| 10,805,719 | B2 | 10/2020 | Sarvis et al. | |
| 11,871,179 | B1 | 1/2024 | Van Den Abeele | |
| 2005/0117768 | A1 * | 6/2005 | Tamura | H04R 1/2819 381/345 |

(Continued)

FOREIGN PATENT DOCUMENTS

WO WO-2023105854 A1 * 6/2023 ........... H04R 1/2888

OTHER PUBLICATIONS

Lenc, et al., "Neural Tracking of the Musical Beat is Enhanced by Low-Frequency Sounds", Psychological and Cognitive Sciences, vol. 115, 32, pp. 8221-8226 (2018).

(Continued)

*Primary Examiner* — Sean H Nguyen
(74) *Attorney, Agent, or Firm* — David J. Thibodeau; VLP Law Group LLP

(57) ABSTRACT

A loudspeaker cabinet designed for bass guitar amplification and performance, with long and curved, side-ported vents that reproduce and distribute low frequencies at up to 6 db greater loudness to the sides, where fellow musicians will commonly perform on stage. The vents also function as cross-bracing to stiffen the cabinet for better low frequency response. The vents tune the cabinet to the lowest possible frequency that will not induce driver voice coil excursions beyond mechanical limits. In addition, the vents are of sufficient cross-sectional area to prevent port air speed from exceeding a defined limit, such as 25 meters/second, which would otherwise result in destructive and non-musical port noise called "chuffing". A variety of vent and port geometries are possible within these design constraints.

16 Claims, 14 Drawing Sheets

(56) References Cited

U.S. PATENT DOCUMENTS

| | | | | |
|---|---|---|---|---|
| 2008/0110692 | A1* | 5/2008 | Moore | H04R 1/30 181/156 |
| 2008/0130932 | A1* | 6/2008 | Schultz | H04R 1/2857 381/337 |
| 2014/0291065 | A1* | 10/2014 | Kim | H04R 1/2865 181/199 |

OTHER PUBLICATIONS

Etani, et al., "A review of psychological and neuroscientific research on musical groove", Neuroscience and Biobehavioral Reviews 158 105522 (2024).

Burger, et al., "Synchronization to metrical Levels in Music Depends on Low-Frequency Specrtal Components and Tempo", Psychological Research 82, pp. 1195-1211 (2018).

* cited by examiner

LOUDSPEAKER CABINET INCORPORATING CURVED VENTS

BACKGROUND

This patent application relates to the bass cabinets used with musical instruments.

Bass amplifier speaker cabinets are essential for achieving clean and full-spectrum output for musical performances. Cabinets designed specifically for the bass guitar can help project proper tone clearly whether on stage, in a studio, or during practice. Such a dedicated bass cabinet can be engineered to handle the low frequencies produced by a bass guitar without distortion. Unlike general purpose loudspeakers, dedicated bass cabinets typically also feature robust drivers and tuned enclosures for optimal low end performance.

U.S. Pat. No. 2,491,982 shows a reflex-type loudspeaker cabinet, promulgating lower frequencies through ports, by dampening higher frequencies from driver back wave energy, and allowing lower frequencies to escape through ports.

U.S. Pat. No. 3,688,864 is dynamic damping loudspeaker system that includes at least two similar loudspeakers which radiate from an enclosure in response to the simultaneous receipt of the same signals. The diaphragms of the loudspeakers are acoustically coupled by an air chamber and a tuning duct connects the air chamber to the atmosphere.

U.S. Pat. No. 4,201,274 shows and describes a cubicle enclosure for a speaker having reflex ports peripherally disposed on one face thereof and outwardly of a centrally disposed circular aperture. A first pair of ports lie diametrically opposed to each other on a vertical plane bisecting the enclosure body, and a second pair of ports lie diametrically opposed to each other on a horizontal plane also bisecting the enclosure body. Each port extends inwardly of the housing, to co-act with reinforcing members that make the housing rigid and immutable to vibration.

U.S. Pat. No. 4,593,784 relates to an enclosure for an electromagnetic loudspeaker of the type having both front and back acoustic waves, with the front of the speaker registering with a front wave opening and the back of the speaker communicating through a transmission line cavity with a port the plane of which is disposed substantially normal to the plane of the front wave opening.

U.S. Pat. No. 6,411,720 concerns a speaker system providing a lower frequency of resonance with a short air passage located in a cabinet between the speakers or drivers and an air passage exit. The resulting exiting column of air lowers the resonant frequency or the drivers.

U.S. Pat. No. 8,066,095 describes a compact bass speaker cabinet that uses a long, narrow, tapered waveguide that acts to direct a small radial portion of the air outside a large pulsating sphere, to have the same bass response as the large pulsating sphere.

U.S. Pat. No. 10,805,719 concerns a loudspeaker that comprises a wedge-shaped cabinet having front, back, top, bottom, left and right side faces, a baffle positioned and covering a portion of the front face of the cabinet, a low frequency driver positioned behind the baffle and spaced rearwardly therefrom toward the back face of the cabinet, and a vertically-aligned array including a plurality of high frequency drivers supported by the baffle. Vents can be tuned to the relatively low acoustic output of an electric bass guitar.

U.S. Pat. No. 11,871,179 mentions that a bass reflex enclosure may include a low-pass loudspeaker chamber and exhibit a tuning frequency as provided by one or more tuned ports pneumatically linking the otherwise hermetic said chamber to the external air for extended low-frequency response, reduced distortion, increased efficiency or reduced enclosure size.

SUMMARY

A vented bass cabinet includes at least two very long, curved vents that each have a defined cross section and median length, in a cabinet of defined net interior volume. The vents are fabricated in a gentle C-shape. The vents are coupled to one or more side ports in the cabinet, with ports preferably located on at least two opposing sides of the cabinet. In a common configuration, the cabinet is rectilinear in dimension and the vents are rectangular in cross-section to minimize size. Curving of the vents permits each vent to be much longer than any dimension of the cabinet itself.

The vents are preferably located side-by-side, so that they can be integrally joined to form part of the bracing of the cabinet, as low frequency energy is lost when unsupported or unbraced cabinet walls can flex freely. The vents span across a major dimension of the cabinet interior, joined to the port orifice on one side, and with simple shims integrally joined to the opposite wall, which provides increased stiffness with minimal use of materials. Thin wall construction is both lightweight, and takes up minimal interior volume, so that the entire cabinet can be as small as possible for the targeted frequency range of sound production.

The side-ported vents communicate low frequencies to fellow musicians, who will typically be located to the sides of the bass player, and will be more easily synchronized in playing when the low frequencies are heard, unlike front-ported designs that project sound away from fellow musicians on stage.

However, the vents may also both be ported to one side, for use in bands with fixed stage arrangements, such as where a drummer and/or other rhythm players are staged either to left or right side of the bass player. The vents may also be configured to point to a front side if desired.

When there are two side ports, they are each nominally disposed at a 90° angle to a front driver, but these may also be at any desired angle for cabinets that are not rectilinear, or not four sided, or with curvilinear sides or to other portions of the cabinet.

Lateral symmetry of the vent openings relative to the location of the drivers may assist with driver stability at high power/high volume. This configuration can avoid a potential pitfall of a single-sided port, as that might still require equal left/right spacing of the vent openings within.

The side-ported, long, and curved vents further ensure superb low-frequency response without the common issues of port "chuffing" or driver over-extension. This design allows the cabinets to deliver a rich, deep, and articulate sound that fills a room, providing the sonic depth as much larger cabinets.

More particularly, careful selection of vent cross-section ameliorates the potential for excess air velocity at high levels of amplification, so-called "chuffing" which is the non-musical noise of destructive interference.

It has been found that exit speeds from the port(s) above 25 meters/second (m/s) will usually result in such chuffing (or destructive noise interference) from air moving too fast in the vents. The only way to prevent this is to increase the cross-sectional area of the vents. However, with each increase in cross-section, the vent must in turn also be made longer to sustain the same low frequency tuning. It is the growth of vent cross-sectional area that results in the need for vents that exceed the internal dimensions of the cabinet.

The specifics of cabinet tuning should also ameliorate the potential for damaging excursions of the driver(s), by providing sufficient back-pressure to support the driver at high levels of amplification, so that the drivers do not exceed "Xmax" or the maximum designed excursion or travel distance of the driver voice coil.

The tuning of my cabinet designs, enacted through long, curved vents, is at or near the limit of Xmax for maximum rated power, for better bass without risk of equipment failure or unintended distortion.

The parameters of a preferred design include:

drivers with high Xmax;

a small as possible internal cabinet volume that is still large enough to allow for full extension of the driver(s);

long, curved ports tuned to the lowest usable frequency that will not induce over-excursion at the desired tuning, nor result in chuffing from high port air velocity.

It is common for other bass cabinets to both exceed driver Xmax and experience chuffing at just half their rated power. This is especially true for cabinets designed to unmodified Extended Bass Shelf profile, as shown in their Transfer Function Magnitude (TFM) curves, that will almost certainly violate driver Xmax and have chuffing problems.

The TFM curve of my preferred embodiments is similar to Extended Bass Shelf curves, with the exception that they guard against exceeding Xmax and chuffing problems, which the much longer-than-normal, larger cross-sectional area vents can do, and what necessitates curved designs for smaller cabinets.

DETAILED DESCRIPTION

Figure 1:
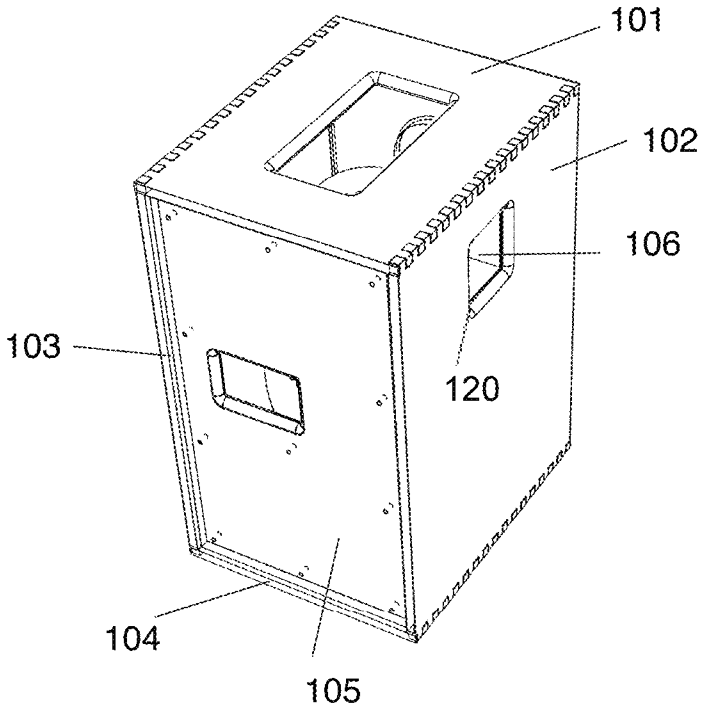
FIG. 1 is a closed-box, perspective view of an example cabinet.

FIG. 1 is closed-box view isometric view of an example cabinet 100 such as for use as a loudspeaker enclosure. As explained in more detail below, this example makes use of a pair of side-by-side vents.

The following list of reference numerals indicates selected parts shown in FIG. 1 (the same reference numerals indicate the same parts in all of the figures):

101 Top of cabinet

102 First side of cabinet

103 Second (opposite) side of cabinet

104 Cabinet bottom

105 Removable back

106 One of two vents, connected to a port 120 in lateral cabinet side (and not the front or back side)

The top 101 of the cabinet has a cutout for later installation of a handle insert.

The first side 102 has a port 120 to accommodate vent 106. The opposite side 103 of the cabinet also has a similar port to accommodate a similar vent (not visible in FIG. 1).

The removable back permits access to components internal to the cabinet such as internal enclosures for midrange drivers and electronics (not shown).

Figure 2:
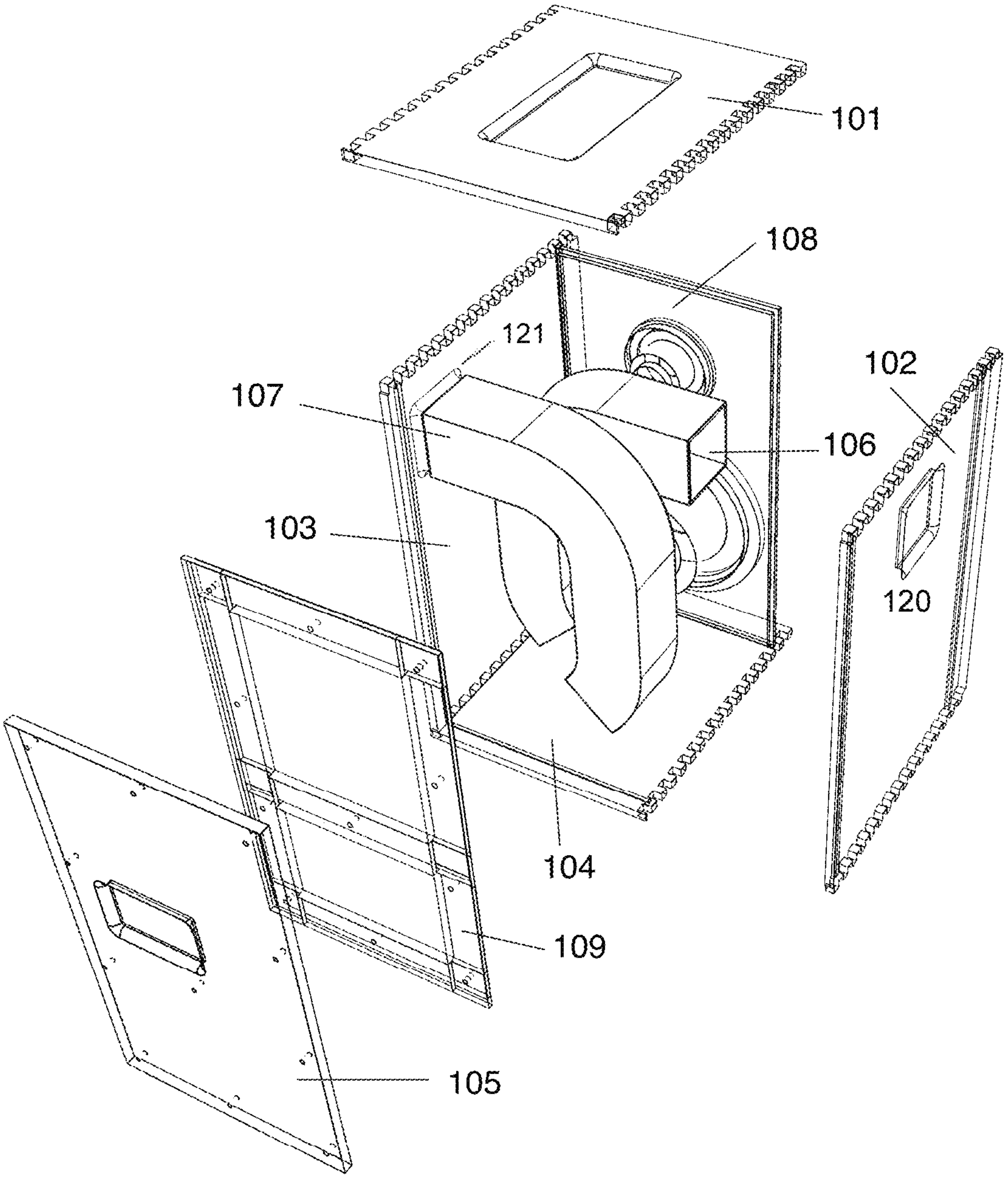
FIG. 2 is an exploded view of the cabinet.

FIG. 2 is a partially exploded view of the example cabinet of FIG. 1. Parts now visible include:

107 The second of two vents.

108 Baffle

109 Back brace

This figure more clearly shows the first vent 106 and second vent 107 and their orientation to the respective ports 120, 121 in the sides 102 and 103. In this design, the generally c-shaped vents 106, 107 are in a side-by-side configuration. They are internal to the cabinet, and opposing, but laterally symmetrical. An opening at the top of vent 106 is coupled to a port in wall 102, and an opening at the bottom of vent 106 is open to the interior volume of the cabinet. Vent 107 has similarly configured openings at each end. The vents 106, 107 are generally rectangular in cross-section.

The baffle is 108 shown with low-range drivers in place, but without showing a midrange enclosure that isolates the midrange from the backwave channeling of the vented cabinet.

Back brace 109 is glued to the removable wall 105 to provide a unified structure.

The two vents 106, 107 are shown in their actual relative placement, as offsetting generally curved C-shaped waveguides, disposed adjacent or nearly adjacent to one another. One of the vents 107 is shown mated to its respective port 121. The understanding is that the other vent 106 is also mated to its respective port 120 in the assembled cabinet.

The two vents 106, 107 are arranged to be mirror-image structures. This provides for laterally balanced venting pressures. They are also aligned and adhered to one another to be mutually self-supporting. The vents 106, 107 are also adhered to selected ones of the cabinet sides in the assembled unit, to form an integrally braced structure for cabinet stiffness.

Small spacers or shim are provided between the parts to further encourage stiffness. Example shims are shown between the two vents 106, 107 and between the vents and the sides of the cabinet.

The vents 106, 107 are preferably symmetrical in relation to the common centerline of the drivers, so one side of the cabinet is not differentially pressurized by back-wave energy, which can otherwise destabilize a driver at high power.

The baffle 108 is also shown here in place, with a schematic rendering of the drivers, and without showing a midrange enclosure that isolates the midrange from the backwave channeling of the vented cabinet.

Referring again to vents 106, 107 note the large cross-sectional area of each, and long median length. A problem with high power bass guitar cabinets is the high speed of air coming out of smaller ports, resulting in noisy and (musically) destructive interference called "chuffing". Chuffing can occur even at half the rated power of the cabinet. The large size of my vents and ports restrict port air velocity to below 25 m/s, which is superior to other designs at high power. The result—no chuffing—is surprising to professional bassists.

Figure 3:
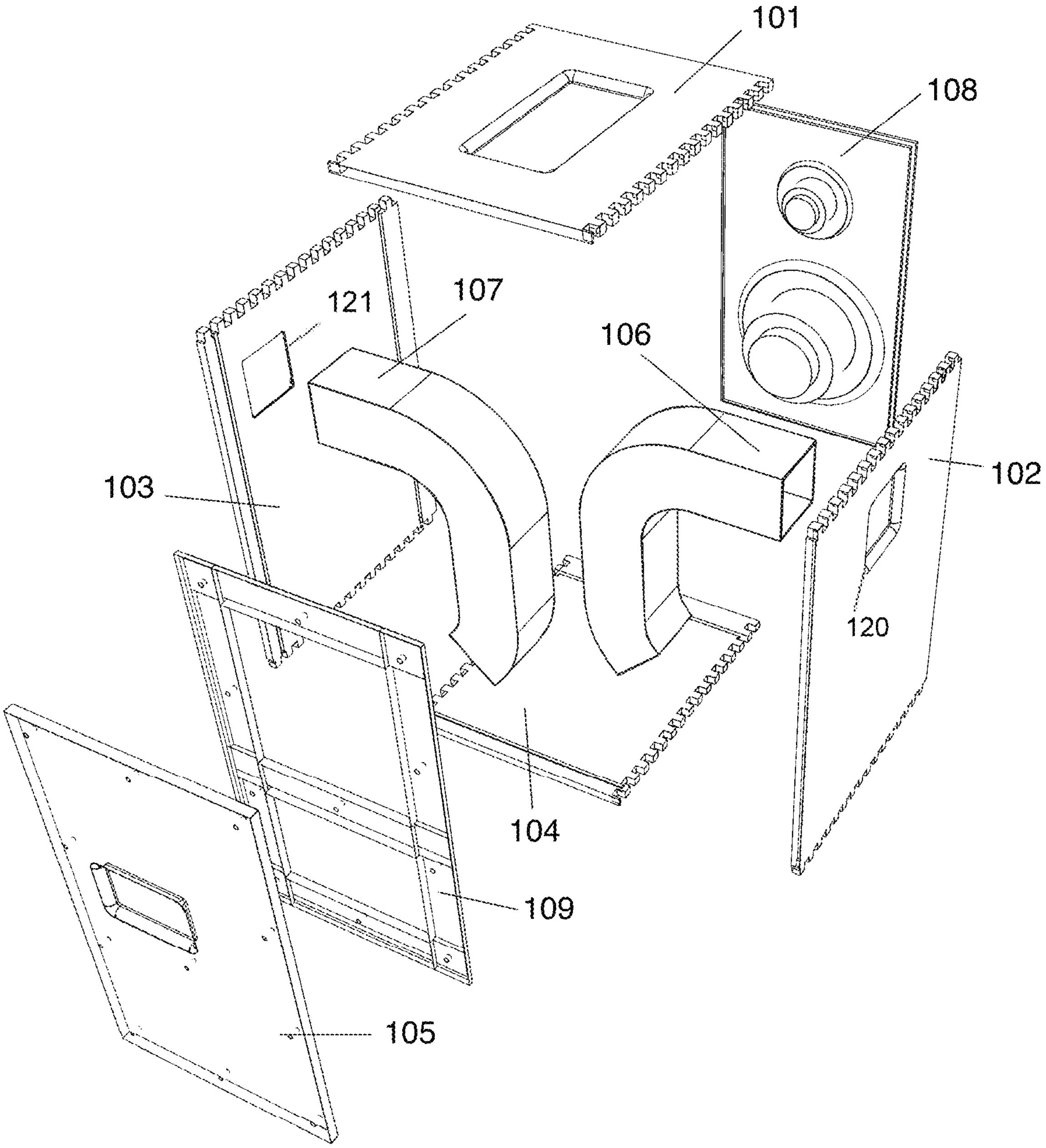
FIG. 3 is another exploded view.

FIG. 3 is another exploded view of the cabinet 100, more clearly showing drivers in baffle 108 and the two opposing ports 120, 121.

Figure 4:
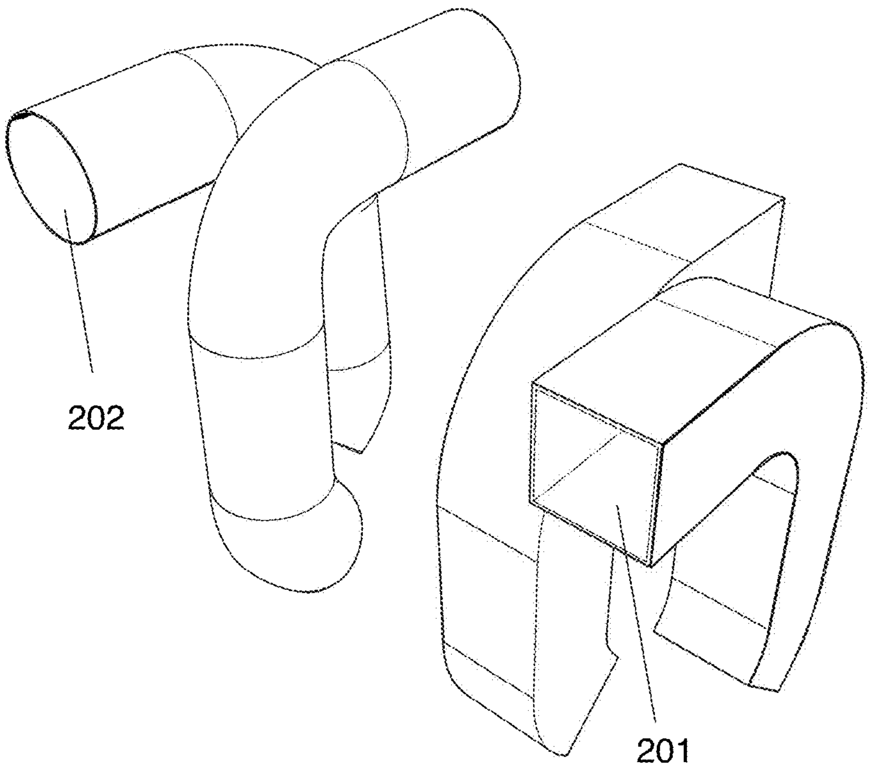
FIG. 4 illustrates some alternative vent designs.

FIG. 4 shows some alternative vent designs, including vents 202 with circular cross-section and vents 201 with square cross-section. Cabinets that utilize these types of vents would have correspondingly shaped exit ports.

Figure 5:
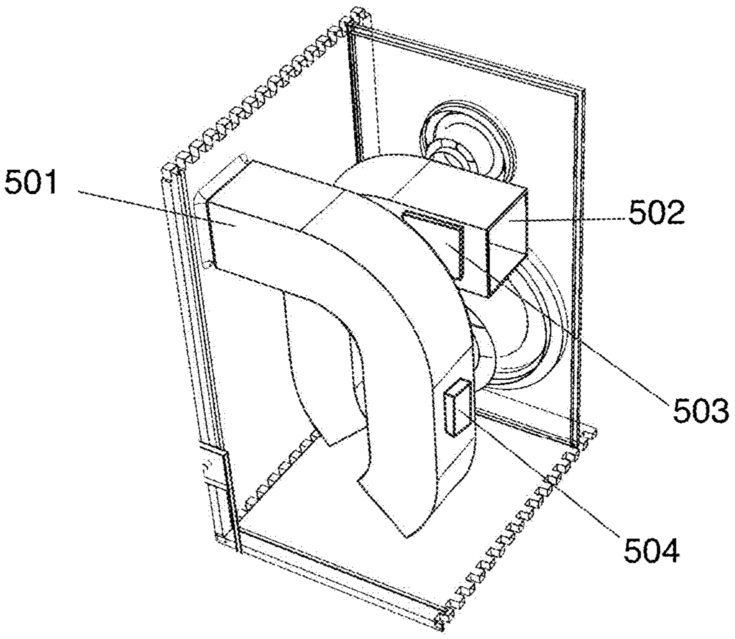
FIG. 5 shows example locations for cross-bracing.

FIG. 5 shows some examples of reinforcements that may be provided. In this view, a first of two vents 501 is showing mating to a port (not numbered). The vent 501 is glued to a wall of the cabinet, thus forming one point of cross-bracing.

A second of two vents 502 is also shown, with the corresponding side wall removed to enable visualizing the location of shims 503 and 504.

A first representative shim 503 is placed between the vents 501 and 502. This arrangement permits gluing or other assembly of the two vents 501, 502 to one another to form an integral unit.

A second representative shim 504 is shown between vent 501 and an opposing wall. This connection of a vent to the wall opposite from its corresponding port resulting in cross-bracing and stiffening of cabinet as a whole.

It should be understood that the shims may be arranged in other ways or that additional shims may be provide in other locations to further stabilize the assembled loudspeaker unit.

Figure 6A:
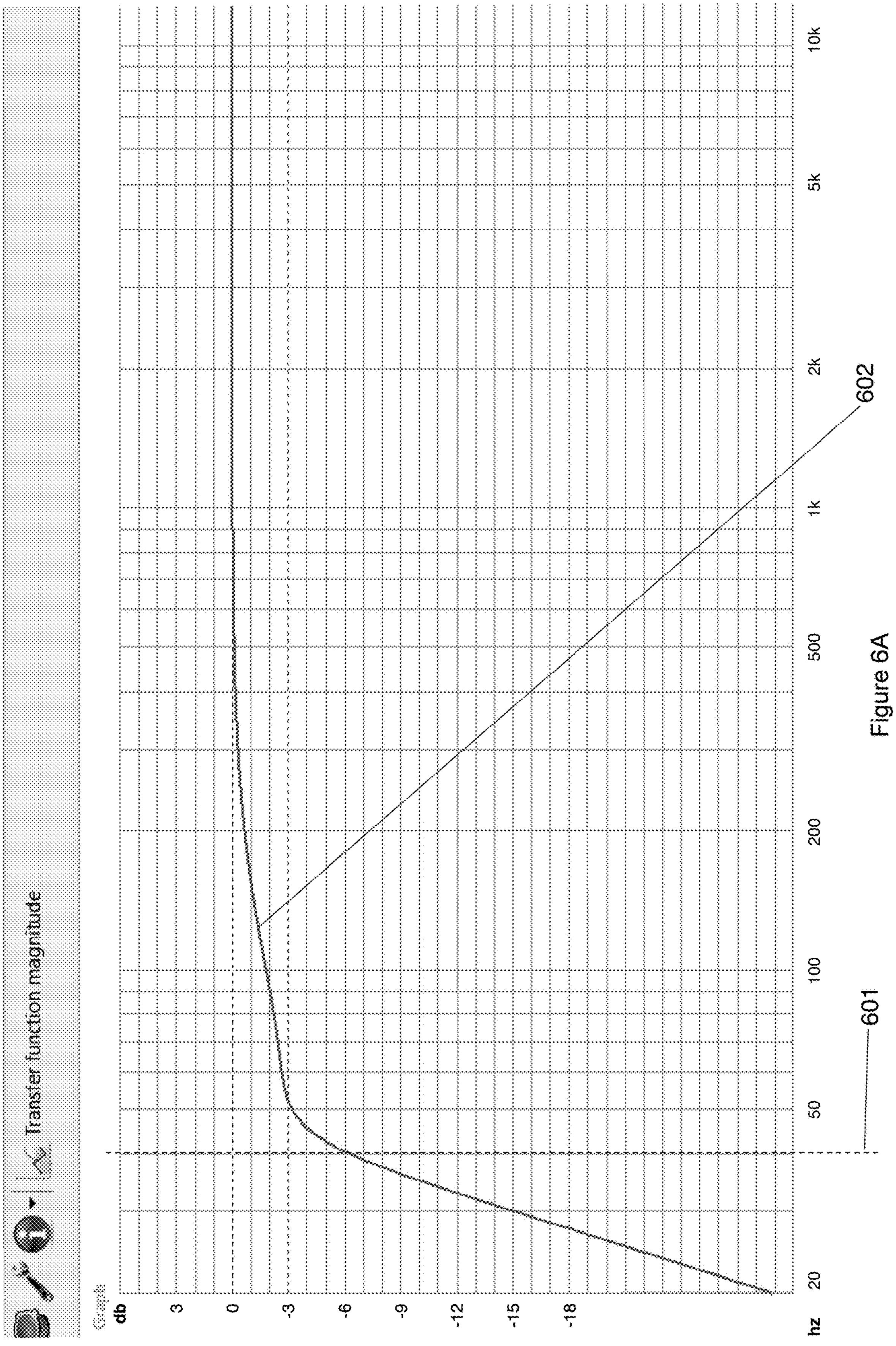
FIGS. 6A, 6B and 6C compare the frequency response of my cabinet design as compared to two other designs.
Figure 6B:
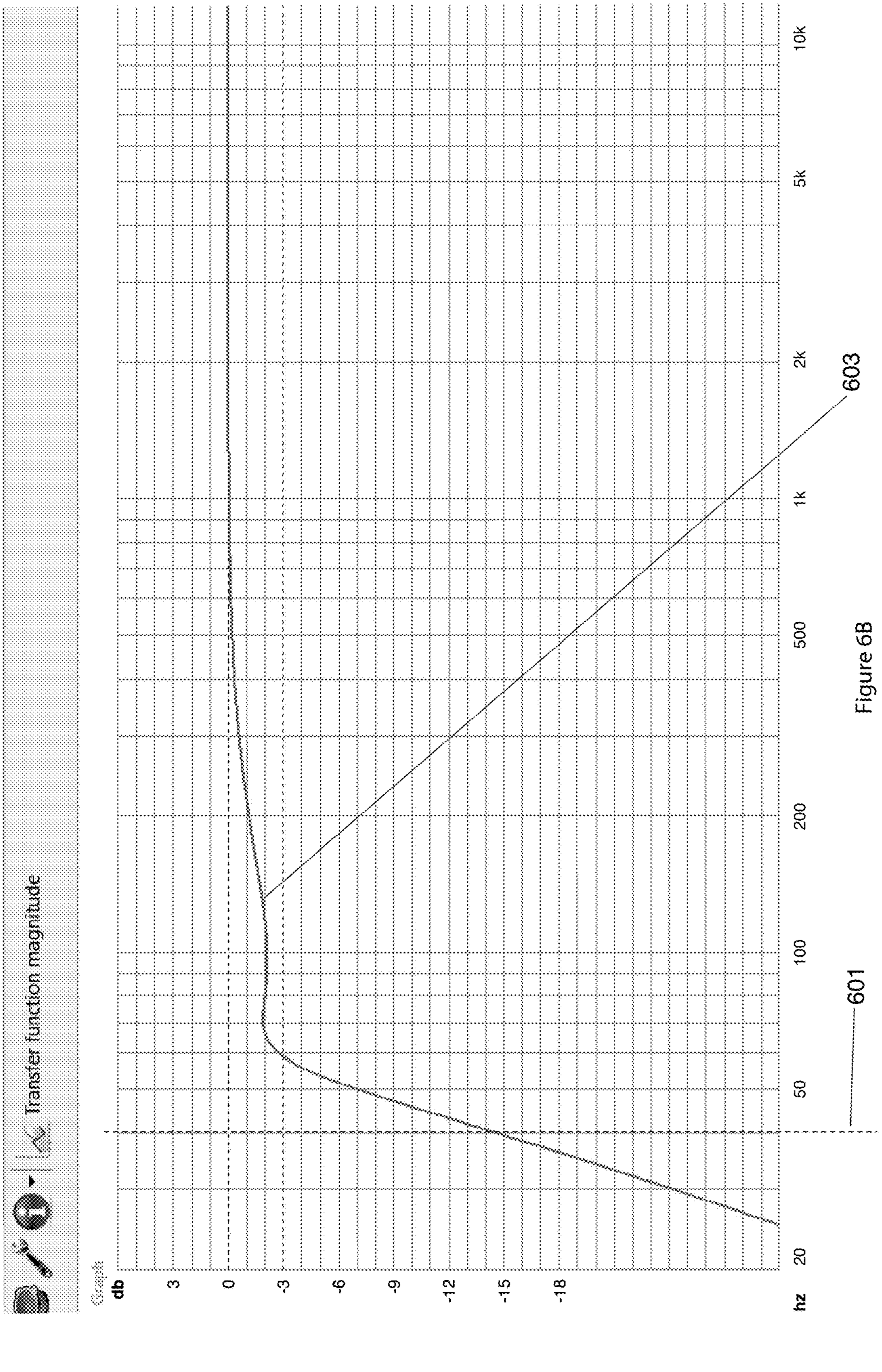
Figure 6C:
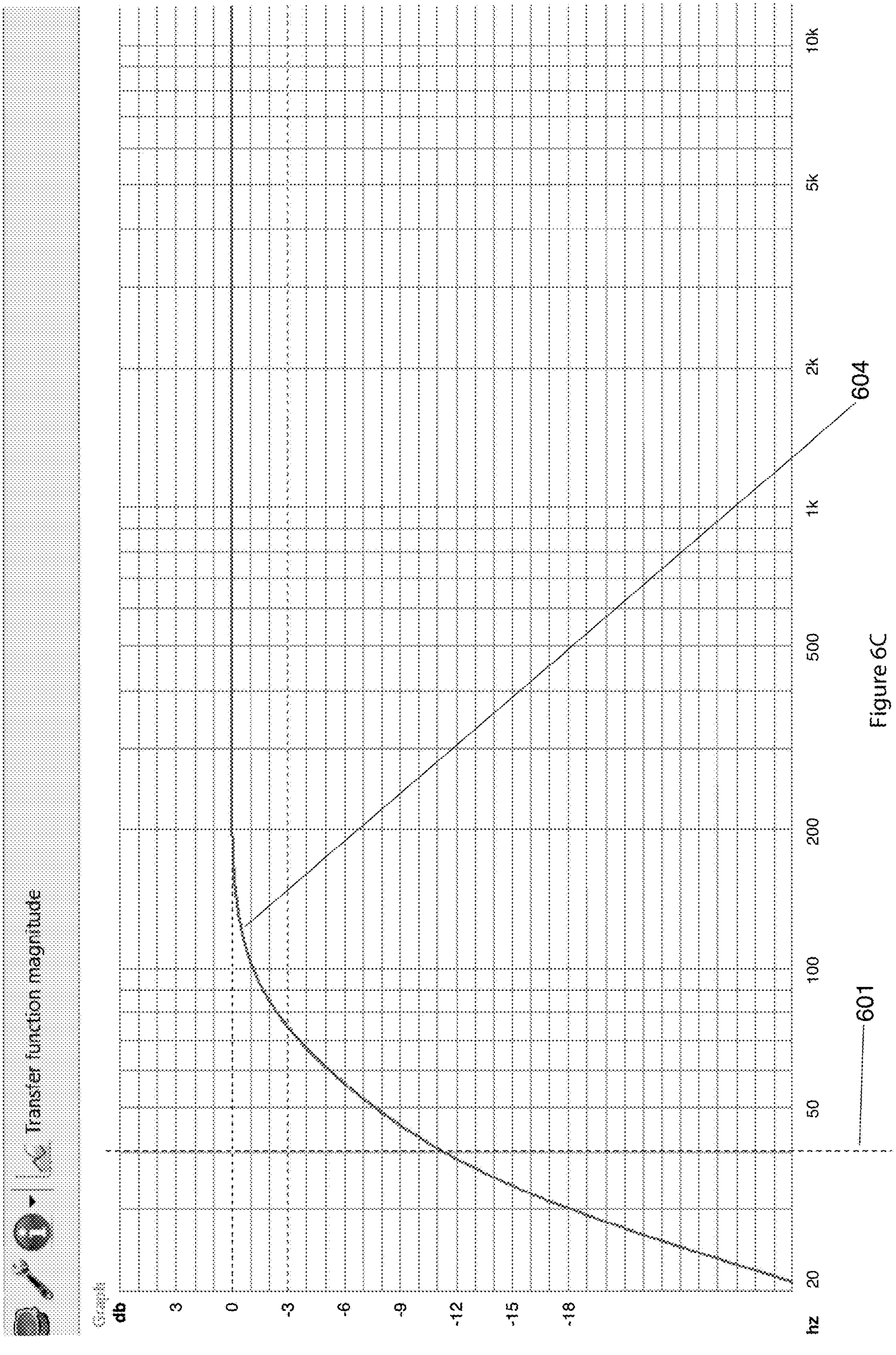

FIGS. 6A, 6B and 6C illustrate some of the improved frequency response with my designs. Line 601 indicates a line common to all three graphs indicating the frequency of open E string on a bass guitar (41.2 Hz).

Curve 602 in FIG. 6A is the frequency response of my design, with open E string produced at −5.6 db.

Curve 603 in FIG. 6B is the response of a prior art "Extended Bass Shelf" (EBS) cabinet design, with open E string at −13.6 db. My design provides at least 8 db better production of the open E string.

Curve 604 in FIG. 6C is the response of another conventional and standard design showing an open E string at −10.8 db. This is superior to the EBS design by 4 db because of the less steep slope of frequency production drop-off. My design is still better than the conventional cabinet by 5.3 db.

These Transfer Magnitude Function (TFM) curves can be considered to represent the tonal signature of a cabinet design, showing how and where frequencies are produced. The tonal signature of my design takes the best elements of both the older standard design and more modern EBS design, while producing better low frequency response.

As reference, a 3 db difference represents a doubling or halving of power (factor of 2), and can be heard as a jump in loudness, perceptually. A 6 db difference will sound significantly louder, and requires 4 times the power. A 9 db or 10 db difference would be heard as twice as loud, requiring 8 times or more power.

Figure 7A:
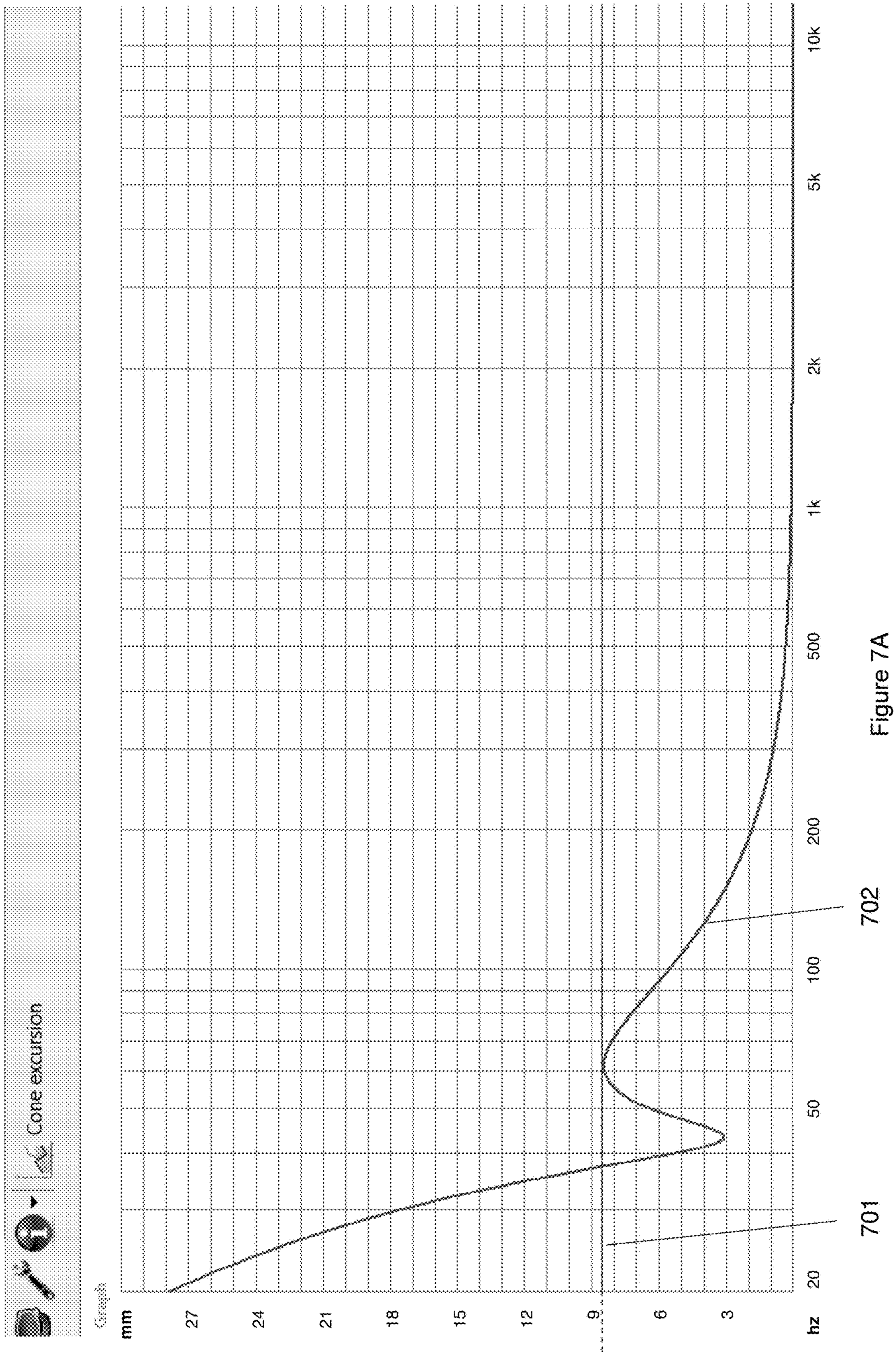
FIGS. 7A, 7B and 7C compare Xmax for my cabinet design to the two other designs.
Figure 7B:
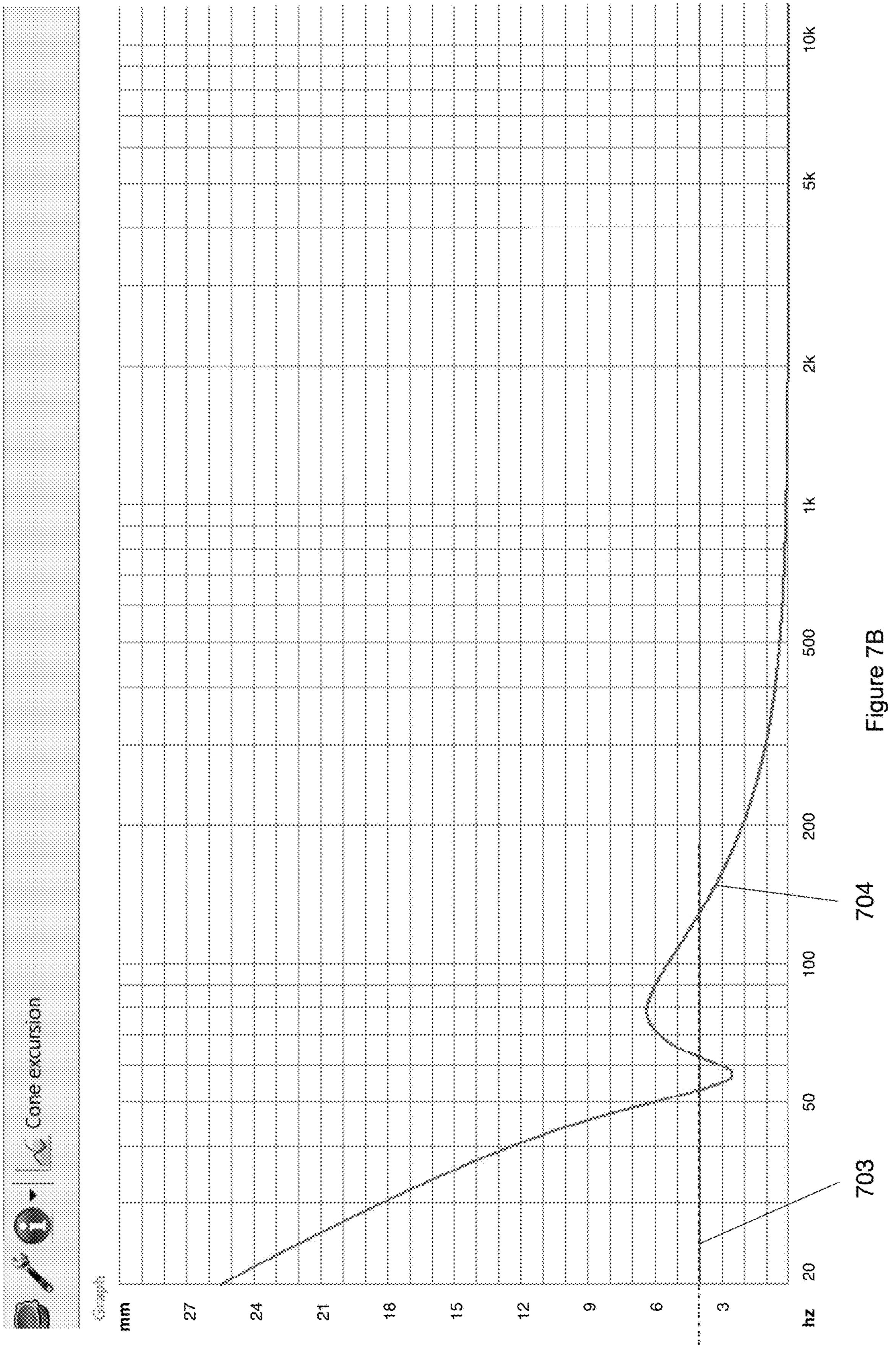
Figure 7C:
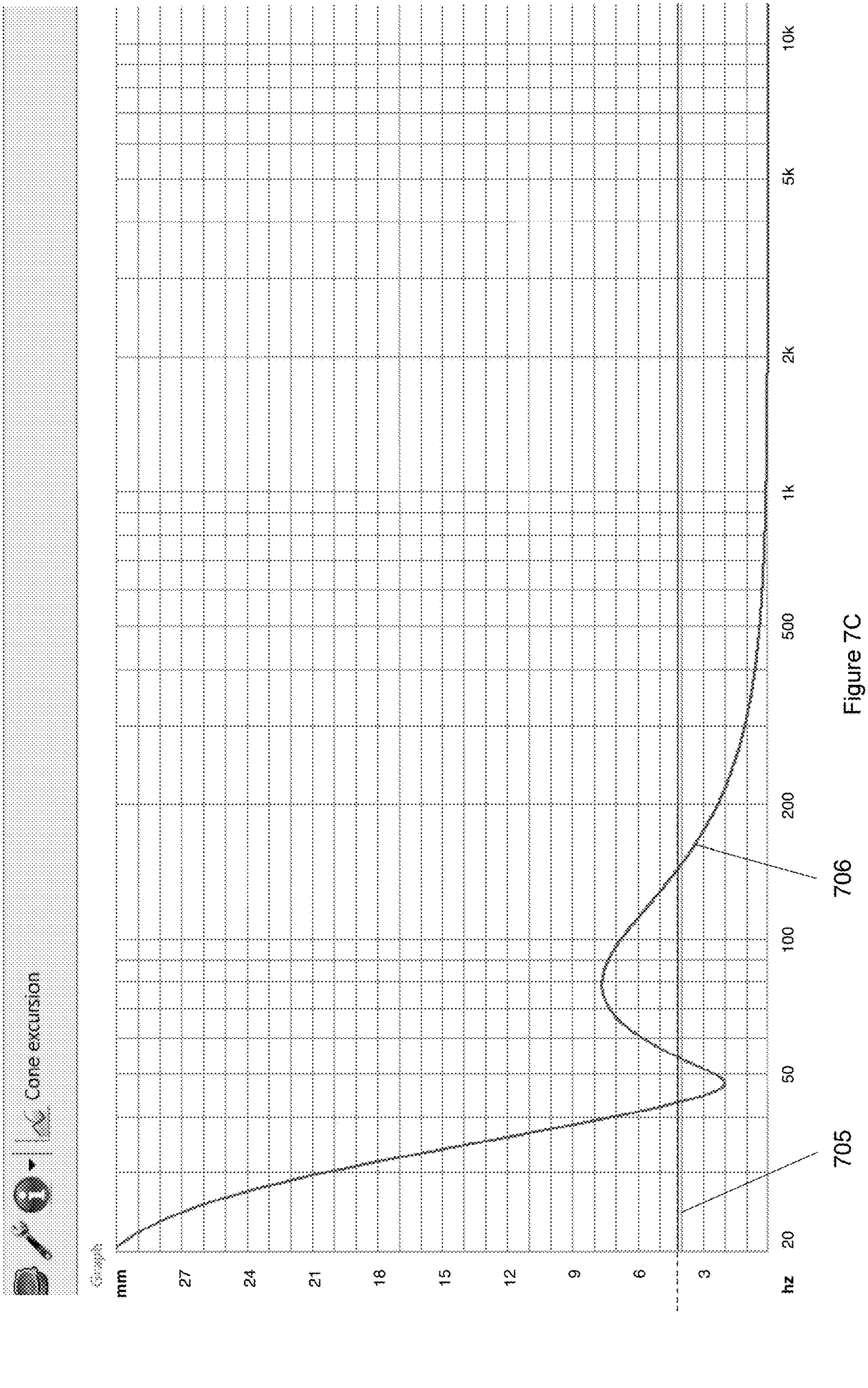

FIGS. 7A, 7B and 7C compare Xmax for my design and other designs.

Referring to FIG. 7A, line 701 indicates Xmax for the driver in my design, with curve 702 indicating the full cone excursion response curve at full rated power. Even at full power, my cabinet design limits excursions from open E and upward.

Many professional amplifiers incorporate high pass filters at 30 hz, to prevent driver damage when using 5 string basses that produce down to an open B string at 31 hz.

At all power levels my design is more protective against driver damage from 5-string bass than standard designs, as at normal power levels for performance, cone excursions are below damaging levels which are nominally twice Xmax.

Because my design is so much louder than both conventional and EBS design from the open A string down, players do not need to turn up their amplifier as loud to hear the low end of their register.

Turning to FIG. 7B, line 703 indicates Xmax for the driver in an Extended Bass Shelf (EBS) design.

The EBS cone excursion curve 704 is indicated for this EBS cabinet at full rated power. Almost the entire range of an electric bass would cause excursions above Xmax, and can easily hit what would be damaging excursions which are nominally twice Xmax.

Even at normal power levels for performance, this style cabinet is stressful on drivers and often close to non-musical distortions from exceeding Xmax.

In FIG. 7C, line 705 indicates Xmax for driver in a conventional cabinet design.

The cone excursion curve 706 for the conventional cabinet design at full rated power is also presented. As with the EBS design, the conventional cabinet is not truly meant to be used at full rated power, considering the levels exceeding Xmax throughout the frequency range.

Even at normal power levels for performance, this style cabinet is stressful on drivers and often close to non-musical distortions from exceeding Xmax.

Figure 8A:
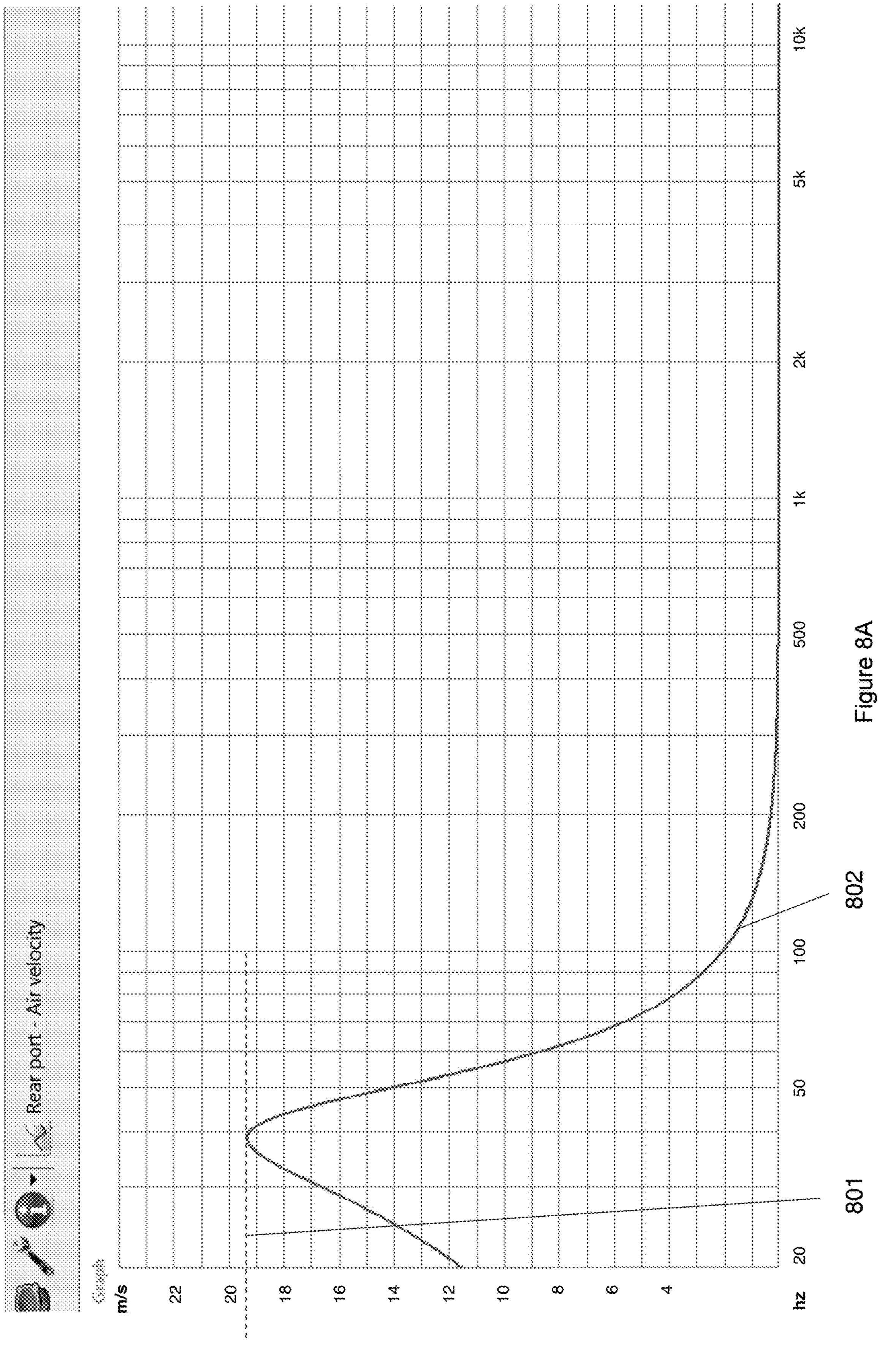
FIGS. 8A, 8B, and 8C compare peak port air velocity for my cabinet design to the two other designs.
Figure 8B:
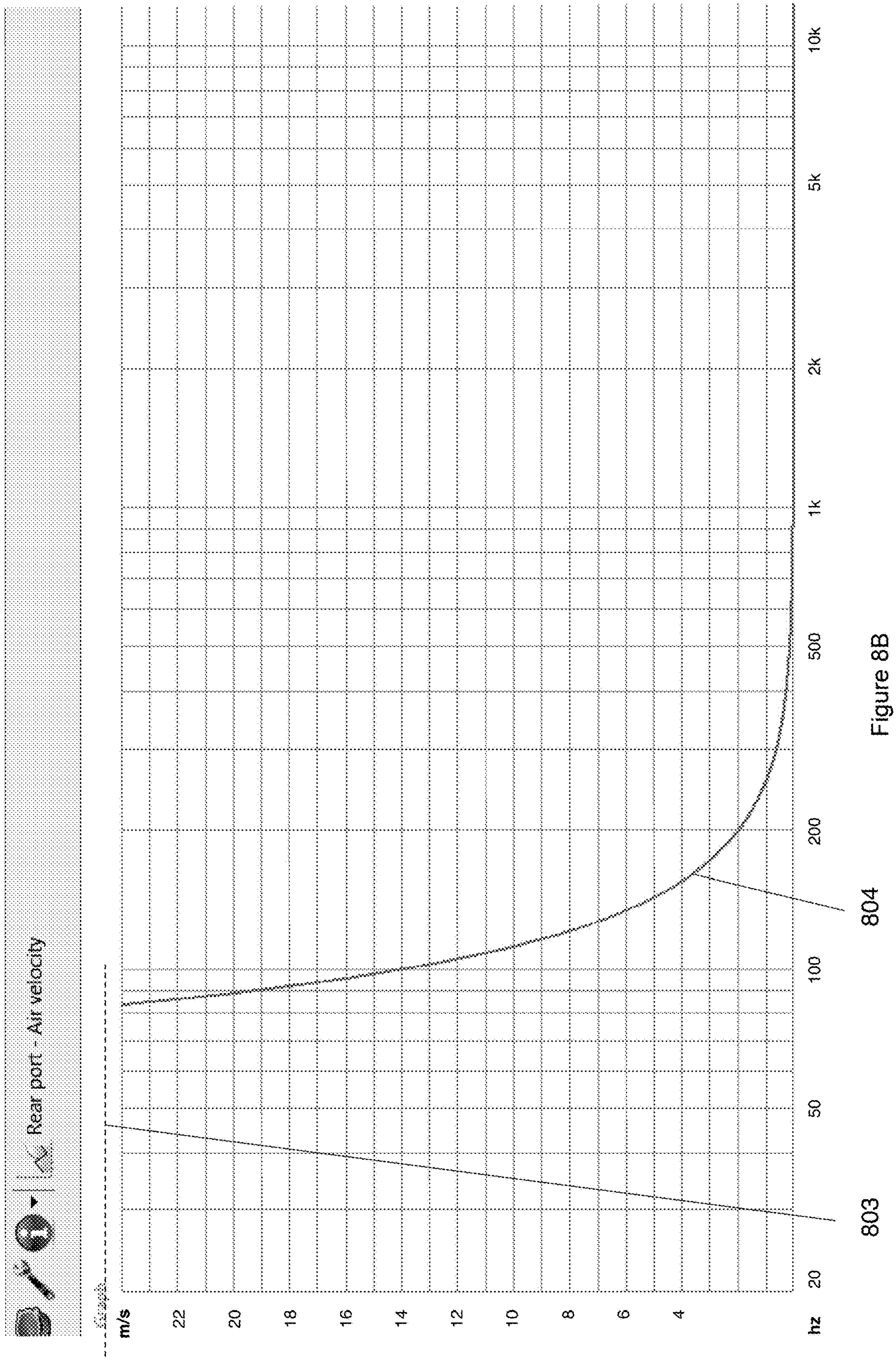
Figure 8C:
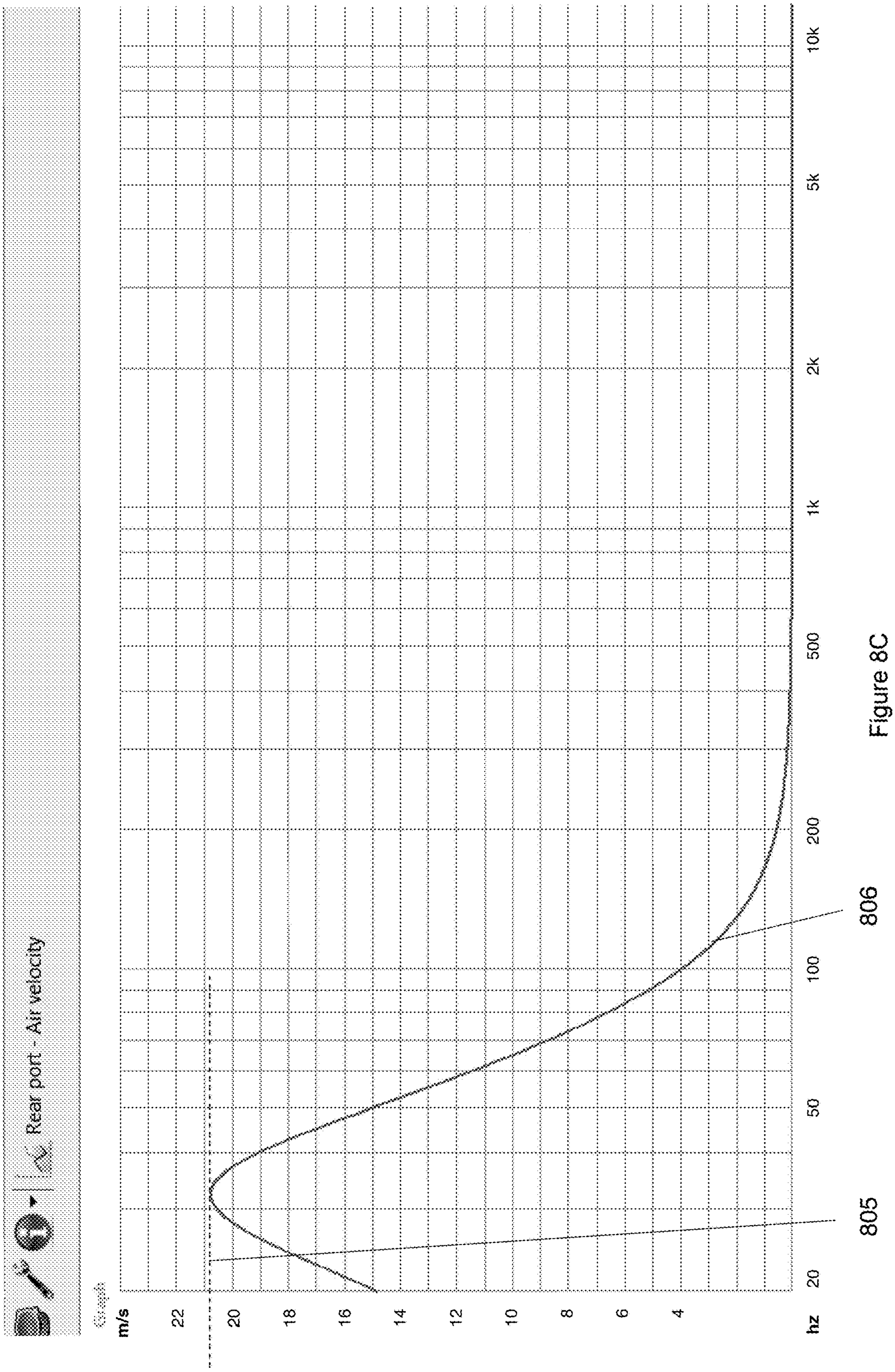

FIGS. 8A, 8B and 8C compare peak port air velocity in my design against other designs.

Line 801 in FIG. 8A indicates the peak port air velocity in my design at full rated power.

The response curve 802 is of my design for port air velocity, measured in meters per second. The peak value for my design is 19.5 m/s.

Line 803 of FIG. 8B indicates peak port air velocity for an Extended Bass Shelf (EBS) design at full rated power.

The response curve 804 for this EBS design for port air velocity, is measured in meters per second. The peak for this EBS cabinet is well off the graph, and exceeds 25 m/s even at half rated power. This type of modern cab is known for "chuffing" problems.

Line 805 in FIG. 8B indicates peak port air velocity of the conventional cabinet design.

The port air response curve of the conventional cabinet design is shown at 806, measured in meters per second. The peak value is 20.8 m/s. This is excellent, even though slightly higher than my design, and shows why the problem of "chuffing" with many modern EBS design cabs is a relatively new frustration to bass players. The standard designs from the late 20$^{th}$ century are relatively immune to chuffing.

Correlating to the TFM (Transfer Function Magnitude), it is precisely by limiting production of lower frequencies that would otherwise cause chuffing. This is the reason why larger arrays of drivers are needed in conventional designs to achieve good stage volume for the low frequencies, and how those cabinets avoid chuffing.

Providing usable and musical "low end" for stage performance is the intent of my designs, permitting use of half the number of drivers to achieve good low frequency response.

The use of my long and curved vents enables production of better low frequency response than either conventional or EBS designs, without common concerns about exceeding Xmax or chuffing.

Observations and Advantages

The low frequency reproduction of the bass cabinet described herein is superior to other designs. That is due-to the cabinet design and use of long, curving vents, designed to suit the T/S parameters of modern, high excursion, low frequency drivers.

In conventional designs, when the cross-sectional area of the vents is inadequate, the resulting design is subject to destructive noise called "chuffing" from port air speeds at or above 25 meters/second. This is believed due the backwave energy of the woofer being constricted by a vent and port being too small in cross-section.

When severely deficient in terms of controlling port air speed, chuffing can shift frequency under high power and the cabinet will shift out of design parameters, becoming "thin" or "weak" due to loss of intended support of specific low frequencies. That is the exact opposite of what the player is seeking by turning up their amplifier.

The physics of vent design dictates that the greater the cross-sectional area, the longer the median vent length needed to sustain the same tuning frequency.

Because of the preference for vents that exceed the internal cabinet dimensions of the "smallest possible" shape, the preferred design uses gentle curves for all angles to create the needed length, instead of 90° or 180° hard bends. This prevent the comb filtering and distortion of reflections that would otherwise occur.

The long, curved vents are advantageous needed for drivers 12" and diameter and below.

Typical other designs will port vents out of the back of the cabinet, when the front face will not easily accommodate the space needed for ports. This results in a fairly long delay in the port produced frequencies that can feel unnatural unless it is intentionally exaggerated through design. And from stage to stage, there can be vast differences in what is behind the musicians, whether an open back stage area, or a wall inches from the cabinet, and so back-vented cabs have to potential to be the most variable in actual use, requiring extensive EQ shifts in different locations.

The side ported designs, as described herein, are an improvement for multiple reasons. It directly communicates greater low end to fellow musicians, such as drummers, who are typically alongside, not in front of the bass player. The side ports' sound is better integrated into the total sound, as it does not need to travel as far as from the back of the cabinet. The side ports can also be of relatively large cross-sectional area without crowding the drivers in the front. The side ports also can be more consistent, like front ports, since the musicians have more control over what is to the front or sides of their equipment, and typically no control over what is behind them.

I have found that for any driver of 12" diameter or less, for example a 10" driver or 9" driver, the resulting vents should be much longer than interior cab dimensions. But for 15" drivers or larger, the cabinets become commensurately larger, and the need for extremely long vents that exceed interior dimensions ceases. But the common conventions of sound reproduction curves are extended to all driver sizes, meaning that the design curves of frequency response—TFM—mostly match across driver size, in what can be considered a "tonal signature". The TFM curve of my preferred embodiments using 9" and 10" drivers has a different "tonal signature" with more low end response and less emphasis of low midrange. This innovation of an unconventional but musically desirable tonal signature can be extended to 15" drivers with the use of longer-than-conventional vents that allow for low tuning, no violation of driver Xmax, and no chuffing, while matching the TFM curve of current embodiments of the invention, for superior low end from smallest possible cabinets with 15" or larger drivers.

I have developed three different sized reference versions of the bass cabinet design shown in FIGS. 1, 2, and 3 as follows.

1. The "Trudeep 10 μm"

350 watts rating; F3@52 hz, F6@40 hz 8 ohms impedance (daisy chain two cabinets for a 4 ohm load).

Two combo Speakon™+¼" jacks

Two vents, each 11.25 sq. in.; 10" driver; 21.45" median vent length

Cabinet Dimensions: 22⅜" high×13" wide×16⅛" deep. Total weight 36 lbs.

2. The "Trudeep 10×"

350 watts rating; F3@59 hz, F6@46 hz 8 ohms impedance (daisy chain two cabinets for 4 ohm load).

2 combo Speakon™+¼" jacks

Two vents, each 11.25 sq. in.; 10" driver; 20.02" median vent length

Cabinet Dimensions: 18¼" high×13" wide×16⅛" deep. Total weight 26 lbs.

3. The "Trudeep 9 μm"

175 watts rating; F3@49 hz, F6@39 hz 8 ohms impedance (daisy chain two cabinets for 4 ohm load).

2 combo Speakon™+¼" jacks

Two vents, each 5.89 sq. in.; 8.75" driver; 21.41" median length

Cabinet Dimensions: 16¼" high×11" wide×11⅞" deep. Total weight 29 lbs.

In some of my designs, a woofer plus additional midrange drivers can be provided in the same cabinet. In that instance, the additional drivers should be fully matched, to eliminate the need for resistors or L-pads (variable resistors) that generate heat by dissipating power. High power midrange takes over before the specialized woofer loses musicality, for expressive, articulate sound.

The crossover electronics for such midrange can be provided, housed or located in other compartments and isolated with resilient mounts, to protect the electronics from damaging constant vibrations emanating from the drivers.

In other configurations, the midrange and driver electronics may be placed in an entirely separate enclosure and connected to the base cabinet with cabling.

The resulting vented cabinets provide amplified bass in live performance settings, replacing sealed design massive "stacks" for all but the largest stages. Cabinets using single or multiple 5", 6.5", 10", 12" or 15" drivers have used the vented designs described herein.

My designs, as described herein, start from an extended bass shelf curve, modified to driver characteristics with greater ability to deliver extreme lows, verging on subwoofer status. (The 10" driver used in the one my designs is classified as either a woofer or subwoofer.) These drivers are capable of high excursions, measured as Xmax, and relatively low sensitivity, meaning the overall output is lower SPL for a given wattage—not as perceptually loud—but the low end is in balance, not absent. The drivers used in my designs are preferably 92 db sensitivity/7.5 mm Xmax, and 90 db sensitivity/8.5 mm Xmax.

In conventional cabinets, the ports are in front, or in the back, as it is commonly understood that very low frequencies are not localized by the listener (how a single subwoofer works effectively with stereo speakers). All speaker cabinets are directional—the sound to either side is attenuated. On stage, the bass cabinet will likely face the audience, putting the drummer to the side in one of the worst possible place to hear it. As the generally desired rhythm section is "locked up" or fully synchronized in beat, this becomes a question of synchrony and entrainment. As these low frequencies are not easily stereo-located by ear, the effect of louder fundamentals to the sides of the cabinet will be experienced as simply "louder bass" rather than perceived like drivers pointed toward the ears, as would be the case with midrange and higher frequencies.

My designs instead use side ports for the venting, with one on each side of the cabinet. This arrangement increases communication with other players, who will more than likely be to either side of the bass player's gear. My designs are explicitly intended to assist entrainment, within the musical group, and as such, with the audience.

The side ports also serve an aural function for the acoustic or stand-up bass player. They often need amplification to keep up with drums and electric keyboards and guitars. In general, acoustic basses transmit sound in a wider pattern, unlike drivers, and the side-ported designs are closer to that sense of "emanation" rather than point-source sound, making the designs more spatial and rounded, as well as delivering better reproduction of low end.

It is submitted that my invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed to be equivalent to those illustrated in the drawings and described in the specification.

Therefore, the foregoing examples should be considered illustrative of the principles of the invention and not limiting. Further, since numerous modifications and changes will readily occur to those skilled in the art, it is not desired to limit the invention to the exact construction and operation shown and described, and accordingly, all suitable modifications and equivalents may be resorted to, falling within the scope of the invention as recited in the following claims.

The invention claimed is:

1. A loudspeaker cabinet apparatus comprising:
a generally rectangular housing having a height, width, and depth;
one or more drivers;
two or more curved vents disposed within the housing, each vent having a defined cross section, and each vent having a gentle C-shape along an axis perpendicular to the defined cross section, and each vent being longer than any of the height, width or depth of the housing;
wherein the vents are further:
configured to channel backwave energy from the one or more drivers;
disposed adjacent to one another and mutually self-supporting; and
coupled to respective side ports that are located on opposite faces of the housing.

2. The apparatus of claim 1 additionally comprising:
wherein the vents are further configured to tune the cabinet to a lowest usable frequency for a selected one of the one or more drivers at full rated power.

3. The apparatus of claim 1 wherein the defined cross-section of each of the two or curved vents is chosen to restrict port exit speed to below 25 meters per second or less at full rated power.

4. The apparatus of claim 1 wherein the vents and ports are rectangular in cross-section.

5. The apparatus of claim 1 wherein the vents and ports are non-rectangular in cross-section.

6. The apparatus of claim 1 wherein the housing includes curvilinear sections or constructions, or faces that include other than two planar faces in 180° opposition.

7. The apparatus of claim 1 wherein the one or more drivers are located in acoustically separated spaces within the cabinet.

8. The apparatus of claim 1 wherein the one or more drivers are configured for delivering low end frequencies of bass guitars and/or acoustic basses.

9. The apparatus of claim 1 further comprising:
additional drivers disposed within the housing, the additional drivers being configured to produce higher frequencies; and
crossover electronics, housed in isolated interior housings within the cabinet.

10. The apparatus of claim 9 wherein the additional drivers comprise:
midrange drivers, tweeters, or mid-bass drivers.

11. The apparatus of claim 9 wherein the crossover electronics are configured to attenuate distortion introduced by the additional drivers.

12. The apparatus of claim 9 wherein the crossover electronics are configured to:
(a) split frequency content to a low frequency driver and one or more of a mid-range driver and a high frequency driver; and
(b) attenuate distortion inherent in the low frequency driver.

13. The apparatus of claim 9 wherein the crossover electronics are configured to:
(a) split frequency content to a low frequency driver and one or more of a mid-range driver and a high frequency driver; and
(b) attenuate distortion inherent in the low frequency driver to produce a more accurate harmonic output.

14. The apparatus of claim 1 further comprising:
additional drivers, configured to produce higher frequencies disposed along with crossover electronics in a separate enclosure from the housing.

15. The apparatus of claim 1 additionally comprising:
one or more shims disposed between at least two of the vents.

16. The apparatus of claim 1 additionally comprising:
a shim disposed between at least a selected one of the vents and a selected wall of the housing, the selected wall being opposite the wall having the side port to which the selected one of the vents is coupled.

* * * * *